US008806182B2

United States Patent
Rymarczyk et al.

(10) Patent No.: US 8,806,182 B2
(45) Date of Patent: *Aug. 12, 2014

(54) MULTIPLE-CORE PROCESSOR SUPPORTING MULTIPLE INSTRUCTION SET ARCHITECTURES

(75) Inventors: James Walter Rymarczyk, Austin, TX (US); Michael Ignatowski, Red Hook, NY (US); Thomas J. Heller, Jr., Rhinebeck, NY (US)

(73) Assignee: Microsoft Corporation, Redmond, WA (US)

( * ) Notice: Subject to any disclaimer, the term of this patent is extended or adjusted under 35 U.S.C. 154(b) by 68 days.

This patent is subject to a terminal disclaimer.

(21) Appl. No.: 13/182,181

(22) Filed: Jul. 13, 2011

(65) Prior Publication Data

US 2011/0271079 A1 Nov. 3, 2011

Related U.S. Application Data

(63) Continuation of application No. 11/468,547, filed on Aug. 30, 2006, now Pat. No. 8,028,290.

(51) Int. Cl.
*G06F 15/00* (2006.01)
*G06F 7/38* (2006.01)
*G06F 9/00* (2006.01)
*G06F 9/44* (2006.01)

(52) U.S. Cl.
USPC ............................................ 712/229

(58) Field of Classification Search
None
See application file for complete search history.

(56) References Cited

U.S. PATENT DOCUMENTS

| 5,095,427 | A | 3/1992 | Tanaka et al. |
| 5,546,554 | A | 8/1996 | Yung et al. |
| 5,774,686 | A | 6/1998 | Hammond et al. |
| 5,946,487 | A | 8/1999 | Dangelo |
| 6,021,489 | A | 2/2000 | Poplingher |
| 6,298,370 | B1 | 10/2001 | Tang et al. |
| 6,948,050 | B1 | 9/2005 | Gove et al. |
| 6,988,183 | B1 | 1/2006 | Wong |
| 7,620,953 | B1 | 11/2009 | Tene et al. |

(Continued)

OTHER PUBLICATIONS

Kahle et al. (Introduction to the Cell Multiprocessor, Sep. 2005, pp. 589-604).*

(Continued)

*Primary Examiner* — Robert Fennema
*Assistant Examiner* — George Giroux
(74) *Attorney, Agent, or Firm* — Jeremy Snodgrass; Ramesh Kuchibhatla; Micky Minhas

(57) ABSTRACT

A multiple-core processor supporting multiple instruction set architectures provides a power-efficient and flexible platform for virtual machine environments requiring multiple support for multiple instruction set architectures (ISAs). The processor includes multiple cores having disparate native ISAs and that may be selectively enabled for operation, so that power is conserved when support for a particular ISA is not required of the processor. The multiple cores may share a common first level cache and be mutually-exclusively selected for operation, or multiple level-one caches may be provided, one associated with each of the cores and the cores operated as needed, including simultaneous execution of disparate ISAs. A hypervisor controls operation of the cores and locates a core and enables it if necessary when a request to instantiate a virtual machine having a specified ISA is received.

13 Claims, 4 Drawing Sheets

(56) References Cited

U.S. PATENT DOCUMENTS

| | | |
|---|---|---|
| 2003/0088604 A1 | 5/2003 | Kuck et al. |
| 2003/0159019 A1* | 8/2003 | Oldfield et al. ............... 712/207 |
| 2005/0050310 A1 | 3/2005 | Bailey et al. |
| 2005/0081181 A1 | 4/2005 | Brokenshire |
| 2005/0160151 A1 | 7/2005 | Rawson et al. |
| 2005/0223199 A1 | 10/2005 | Grochowski et al. |
| 2005/0268070 A1* | 12/2005 | Baxter ......................... 711/203 |
| 2005/0283679 A1 | 12/2005 | Heller, Jr. et al. |
| 2007/0079150 A1 | 4/2007 | Belmont et al. |

OTHER PUBLICATIONS

Pham et al. (Overview of the Architecture, Circuit Design, and Physical Implementation of a First-Generation Cell Processor, Jan. 2006, pp. 179-196).*

Krsul, et al.,"VMPlants: Providing and Managing Virtual Machine Execution Environments for Grid Computing", Nov. 2004, pp. 1-12, Supercomputing, 2004, Proceedings of the ACM/IEEE SC2004 Confererence.

* cited by examiner

MULTIPLE-CORE PROCESSOR SUPPORTING MULTIPLE INSTRUCTION SET ARCHITECTURES

The Present U.S. patent application is a Continuation of U.S. patent application Ser. No. 11/468,547 filed on Aug. 30, 2006, the disclosure of which is incorporated herein by reference.

BACKGROUND OF THE INVENTION

1. Field of the Invention

The present invention relates generally to data processing systems, and more particularly, to processors for running multiple virtual machines having disparate instruction set architectures.

2. Description of the Related Art

Present-day computing systems, and in particular large-scale server systems, often include support for running multiple virtual machines (VMs). The system may be a large-scale on-demand server system that executes hundreds of server instances on a single hardware platform to support customers with varying computing requirements. In the most flexible of these systems, multiple partitions, which may differ in operating system or run-time environment, as well as application mix on those environments, are concurrently present in system memory. Processes executing in each partition are run in an environment that supports their execution on a guest operating system (or run-time environment). The virtual machine provides an environment similar enough to a real hardware platform that the operating system can run with little or no modification. A hypervisor (sometimes referred to as a virtual machine monitor) manages all of the virtual machines or partitions and abstracts system resources so that each partition provides a machine-like environment to each environment instance.

However, in order to provide efficient operation, total virtualization of machine code instruction sets is typically not performed. Such total virtualization, generally referred to as processor emulation, cannot reach the efficiency of a machine executing native machine code. Therefore, the above-described systems, in applications in which the VMs must provide environments supporting different native instruction sets, typically include disparate processing units that implement differing instruction set architectures (ISAs). In some instances, disparate processors must be included for critical applications that can only run efficiently in a particular machine code environment. Therefore, even though a particular operating system or run-time environment may be supported across multiple ISAs, a particular application may require that a particular underlying ISA be provided in support of the VM in which that application runs.

In particular, custom applications tend to evolve on particular platforms and are frequently coded or ported to run on only one ISA. Those applications must be supported, as well as a mix of any other custom applications, as well as off-the shelf software. The result is increased customization of systems for particular applications, increasing system cost, and a reduction in availability and system efficiency in that not every processing element and resource is necessarily available or usable for any task that might be assigned to the system. For example, when a system must support VMs that require both the power PC (PPC) and x86 ISAs, but the demand for x86 VMs is not continuous and represents a varying fraction of the total system throughput required at any given time, the amount of x86 processing support will either be over-installed or under-available for much of the time.

Therefore, it would be desirable to provide an efficient mechanism for supporting multiple VMs requiring disparate ISAs. It would further be desirable to provide such a mechanism that efficiently manages electrical power used by the hardware supporting the multiple ISAs.

BRIEF SUMMARY OF THE INVENTION

The objective of providing an efficient mechanism for supporting multiple VMs requiring multiple ISAs is provided in a processor, processing system, method and computer program product.

The processor includes multiple cores having disparate native ISAs and that may be selectively enabled for operation, so that power is conserved when support for a particular ISA is not required of the processor. The processing system includes one or more such processors and the method of operation is a method of operation of the processing system under control of the computer program product, known as a hypervisor.

The hypervisor determines when a particular VM will be instantiated that requires a particular ISA, locates a processor core capable of supporting the ISA, and enables the processor code if the processor core is disabled. The hypervisor then instantiates the VM in memory and starts the VM execution by the processor core. When the VM is terminated, the hypervisor powers down the core if it is no longer needed.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DETAILED DESCRIPTION OF THE INVENTION

Figure 1:
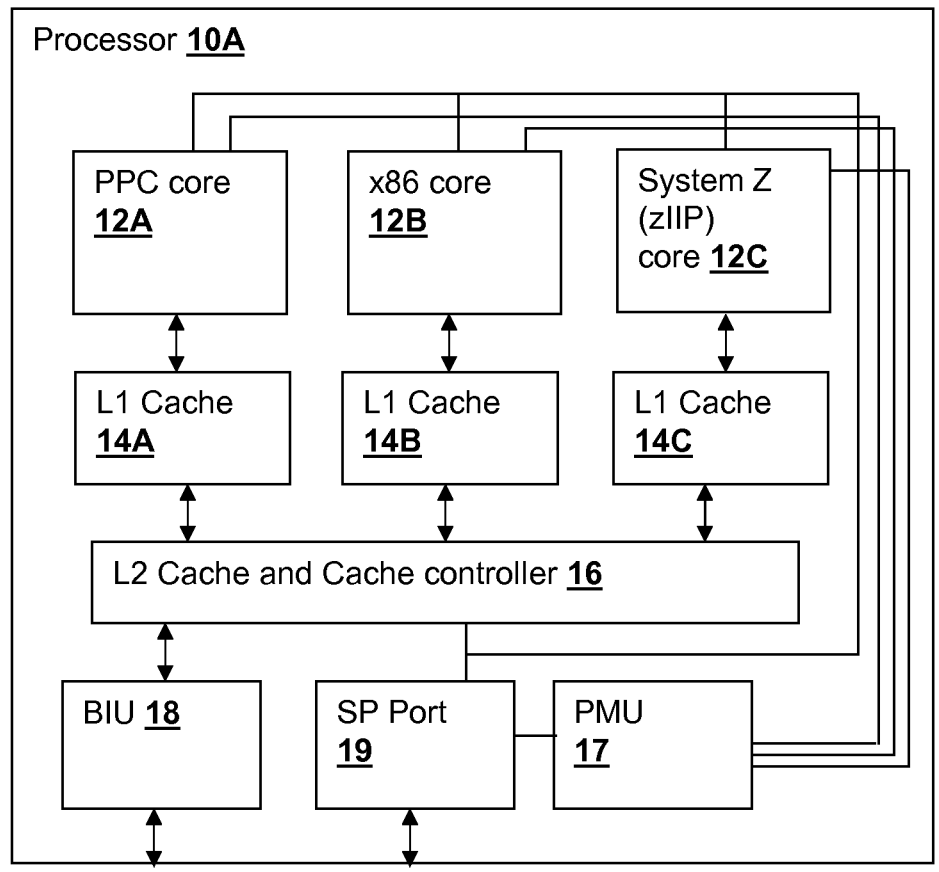
FIG. 1 is a block diagram of a processor in accordance with an embodiment of the present invention.

With reference now to the figures, and in particular with reference to FIG. 1, there is depicted a block diagram of a processor 10A in accordance with an embodiment of the present invention. Processor 10A includes multiple cores 12A-12C each having disparate ISAs. While the illustrative embodiment depicts three cores having different native ISAs, it is contemplated that any desirable arrangement and number of cores may be included within a processor in accordance with an embodiment of the present, as long as at least one of the processor cores has an ISA differing from that of the other cores. For example, in an 8-core processor, one core may support an ISA that is infrequently required, while the other seven cores implement the most universal ISA.

In the illustrated embodiment, core 12A supports the PowerPC (PPC) instruction set as originally promulgated by the Apple-IBM-Motorola (AIM) Alliance, core 12B supports x86 instruction sets as originally promulgated by Intel Corporation and implemented by many present-day manufacturers, and core 12C supports an instruction set optimized for the System Z operating environment, such as the z9 Integrated Information Processor (zIIP) instruction set as promulgated by International Business Machines Corporation. Other types of cores, such as special purpose co-processors and accelerator engines could also be included, but are not illustrated. Each core 12A-12C has an associated L1-level cache 14A-14C, which is then coupled to a common L2-level cache and cache controller 16. Therefore, with proper address space management by cache controller 16 and the hypervisor, all three cores 12A-12C may be operated simultaneously to support concurrent execution of VMs supporting the disparate ISAs implemented by cores 12A-12C. A power management unit (PMU) 17 controls power to each of cores 12A-12C, so that during intervals of time when one or more of cores 12A-12C is not needed, or when system power, processor 10A thermal capabilities, or other resource limitations dictate that only a subset of cores 12A-12C can be simultaneously operational, power is removed from the disabled cores. The L1 cache units that are associated with disabled cores may also be disabled. A bus interface unit (BIU) provides for interfacing processor 10A with other processors and devices, including lower level caches and system memory. A service processor (SP) port 19 provides an interface to a supervisory service processor that performs tasks under direction of the hypervisor and controls PMU 17 to enable, disable, and set the operating environment for cores 12A-12C as cores 12A-12C are brought on-line and off-line.

Figure 2:
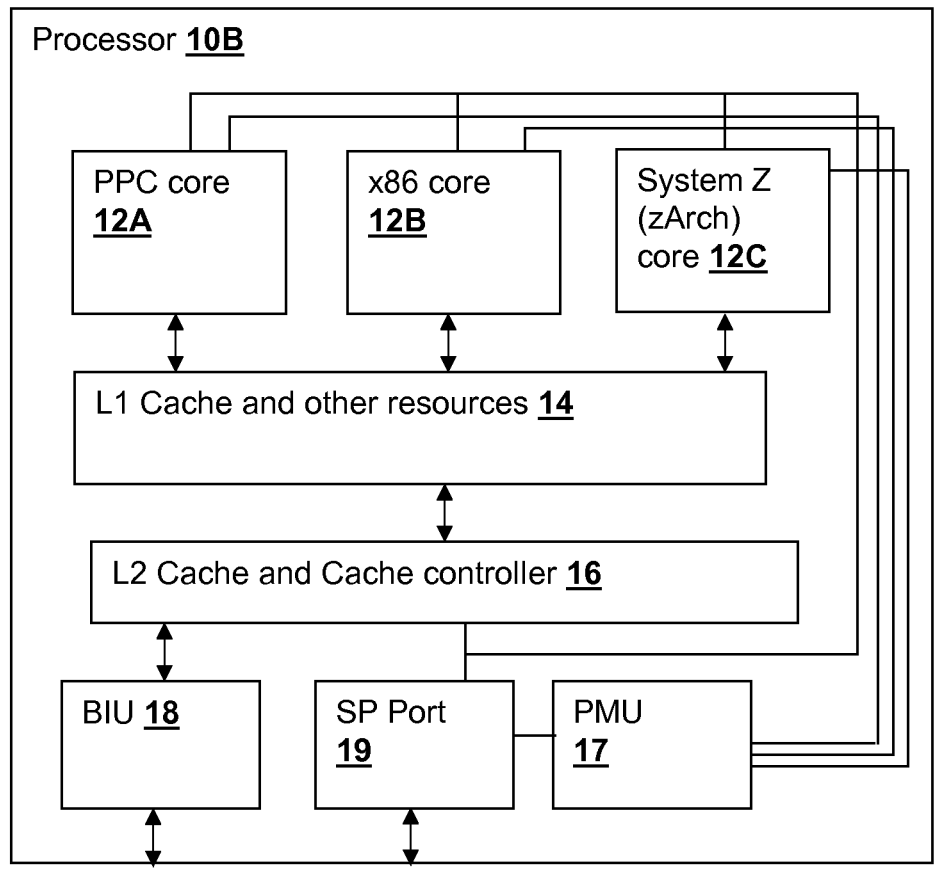
FIG. 2 is a block diagram of a processor in accordance with another embodiment of the present invention.

Referring now to FIG. 2, a processor 10B, in accordance with another embodiment of the present invention, is shown. Processor 10B is similar to processor 10A of FIG. 1, and therefore only differences between them will be described below. In processor 10B, L1 cache and optional other resources 14 are shared in common between cores 12A-C, resulting in a reduction of die area required to implement processor 10B over processor 10A. However, unlike processor 10A of FIG. 1, in processor 10A, PMU 17 only enables one core 12A-C at a time, enabling the sharing of L1 cache and optional other resources 16, such as floating point hardware, register space and other units that can be controlled by control logic provided from cores 12A-C, but that can be designed independent of the ISA of any particular core. For example, a core implementing a first ISA requiring 128 64-bit registers may use the same storage units as a second ISA that requires only 64 64-bit registers, with the other 64 registers disabled or unused when the core implementing the second ISA is active.

Figure 3:
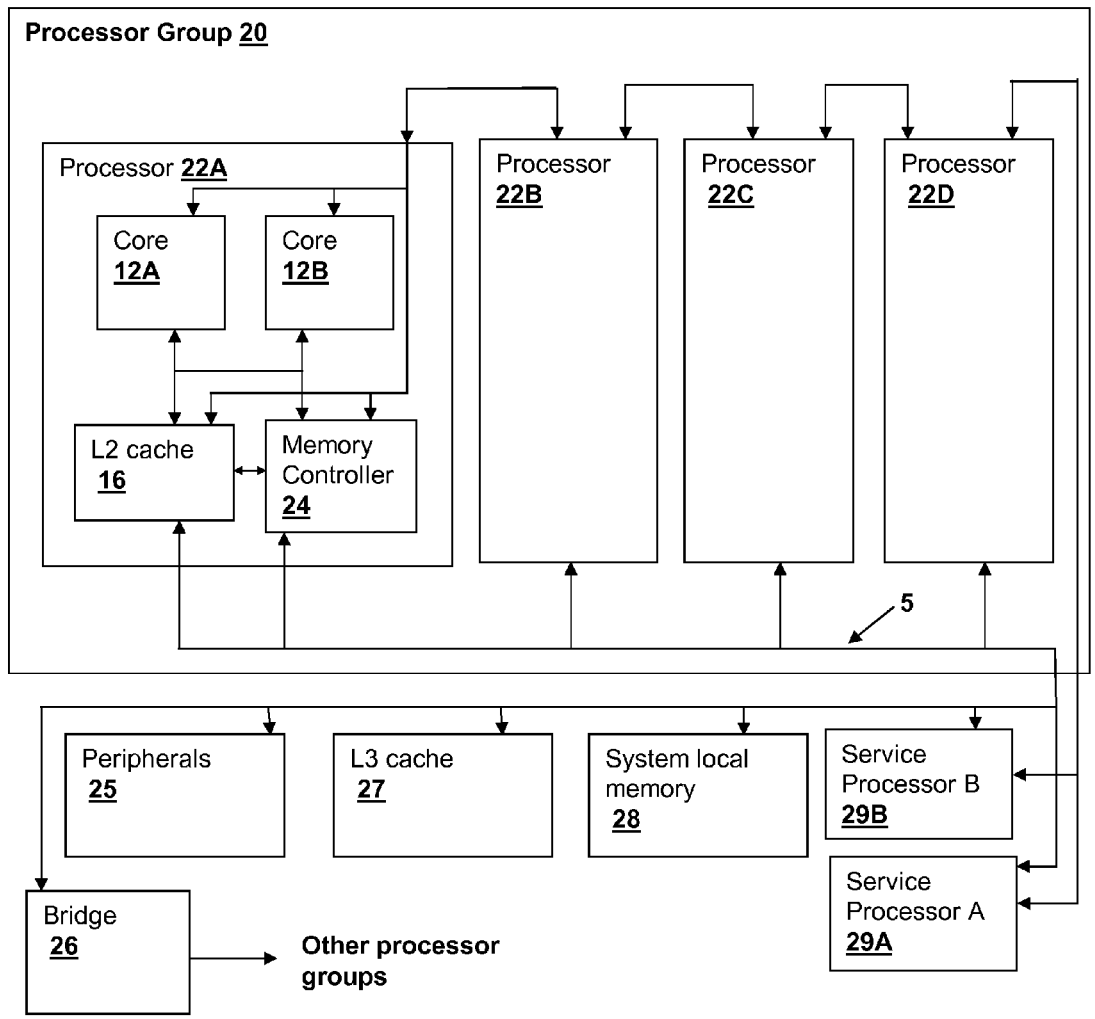
FIG. 3 is a block diagram of a multi-processing system in accordance with an embodiment of the present invention.

Referring now to FIG. 3, a processing system in which processors 10A and/or 10B may be employed, is depicted. It will be understood that the depicted embodiment is not intended to be limiting, but only exemplary of the type of processing system to which the methods and techniques of the present invention may be applied. The processing system includes a processor group 20 having four processors 22A-D, at least one of which includes multiple cores 12A, 12B supporting disparate native ISAs. Processor group 20 may be connected to other processor groups via a bridge 26 forming a super-scalar processor. Processor group 20 is connected to an L3 cache unit 27, system local memory 28 and various peripherals 25, as well as to two service processors 29A and 29B. Service processors 29A-B provide fault supervision, startup assistance and test capability to processor group 20 and may have their own interconnect paths to other processor groups as well as connecting to all of processors 22A-D.

Within processor group 20 are a plurality of processors 22A-D, each fabricated in a single unit and including a plurality of processor cores 12A and 12B that support differing ISAs, and include an internal L1 cache in the illustrated embodiment. Cores 12A and 12B are coupled to an L2 cache 16 and an internal memory controller 24. Cores 12A and 12B provide instruction execution and operation on data values for general-purpose processing functions, but support disparate native ISAs simultaneously or mutually-exclusively as described above. Bridge 26, as well as other bridges within the system, provides communication over wide buses with other processor groups and bus 5 provides connection of processors 22A-D, bridge 26, peripherals 25, L3 cache 27 and system local memory 28. Other global system memory may be coupled external to bridge 26 for symmetrical access by all processor groups. Service processor 29A and 29B are connected to processors 22A-D via a Joint Test Action Group (JTAG) test port interface that has command and logic extensions providing very facile control of processors 22A-D, including disabling and enabling cores 12A and 12B when operating environment and conditions dictate.

Within system local memory 28, a virtual machine monitor program, or "hypervisor", provides support for execution of multiple virtual machines (VMs) or "partitions" that each provide an execution environment for an operating system and a number of "guest" programs (applications and services executed by an operating system and running in the associated VM). By referring to metadata that accompanies each VM, the hypervisor is aware of the resource needs and specific ISA requirements for each VM. The hypervisor instantiates VMs by dynamically assigning their virtual resources to the physical resources of the server. The hypervisor manages the mapping of physical memory to virtual memory space within each VM, and therefore prevents conflicts between VMs for physical memory. By virtue of the virtual mapping and control of cache controllers, the hypervisor also prevents conflicts between higher-level caches such as L1 Caches 14A-14C of FIG. 1 mapping to lines within lower-level L2 cache 16. Thus, under hypervisor management, support for VMs with differing ISA requirements and with multi-threading context support, a processing system including processors in accordance with embodiments of the present invention can provide multi-ISA support without requiring separate discrete processor modules or dies.

Figure 4:
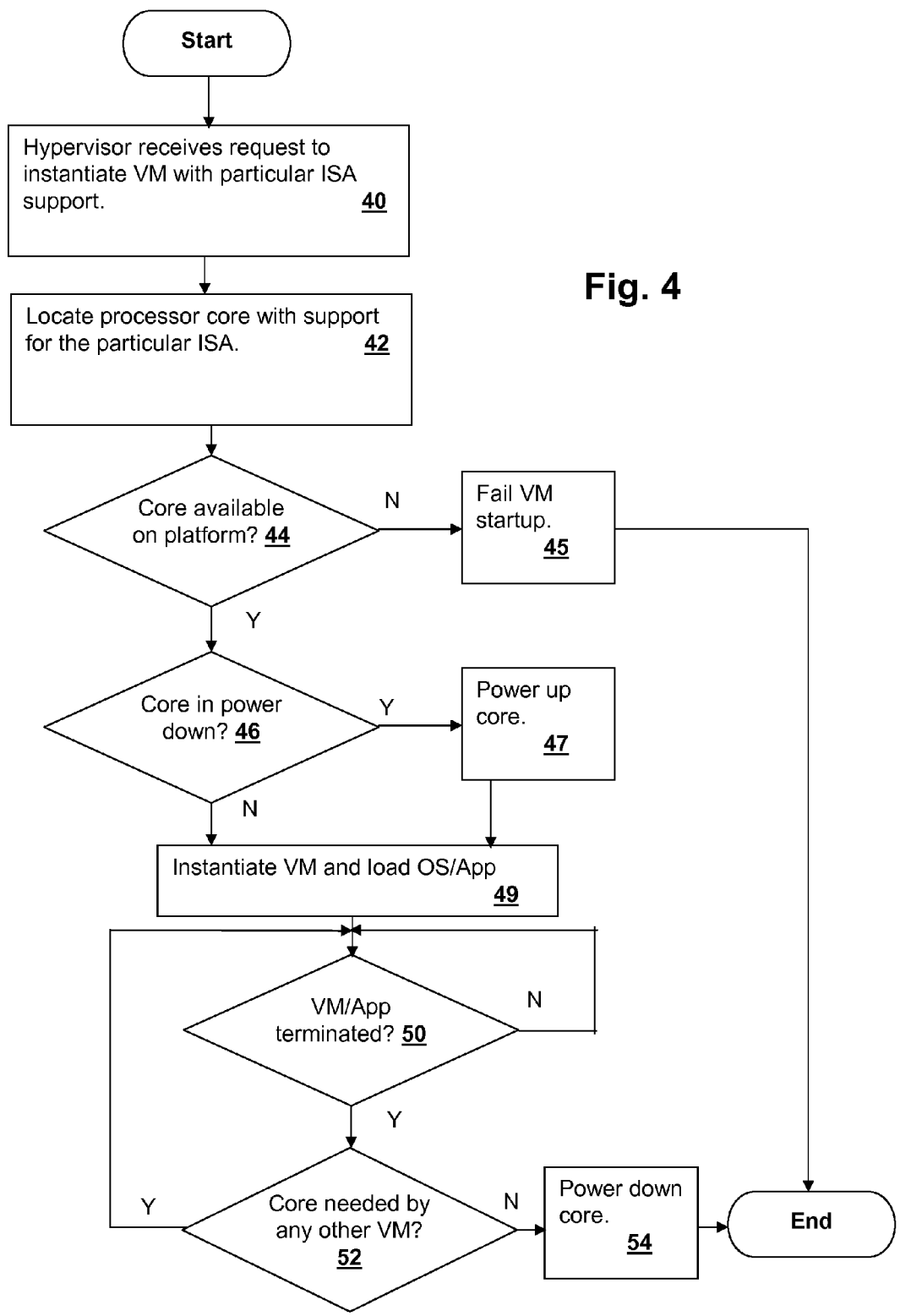
FIG. 4 is a flowchart depicting a method in accordance with an embodiment of the present invention.

Referring now to FIG. 4, a method in accordance with an embodiment of the invention is depicted. The hypervisor receives a request to instantiate a VM with support for a particular ISA (step 40), for example, when a particular application requiring a particular ISA and operating system is started. The hypervisor attempts to locate a core that is available for support of the ISA (step 42), and if the core is not available (decision 44), the VM startup fails (step 45). Otherwise, if the located core is in power-down mode (decision 46), the core is powered up (step 47). Next, the VM is instantiated and the operating system and application are loaded (step 49). When the application or VM terminates (decision 50), if the core is in use by any other VM (decision 52), then the hypervisor waits until all VMs/Apps terminate (decision 50), otherwise, the core is powered down (step 54) until requested again. In the method described above, if the particular hardware implementation requires a significant amount of time to power a core on or off, then the decision to turn off a core can be postponed until some number of idle cycles have passed. In CMOS technologies presently available, times on the order of only a few tens of microseconds are needed to power a core on or off, while the assignment of a virtual processor to run on a core is made for time slices on the order of a millisecond or more.

While the invention has been particularly shown and described with reference to the preferred embodiment thereof, it will be understood by those skilled in the art that the foregoing and other changes in form and details may be made therein without departing from the spirit and scope of the invention.

What is claimed is:

1. A system comprising:
    a first execution core for executing program instructions of a first instruction set architecture in a first operating mode, wherein the first execution core is incompatible with a second instruction set architecture;
    a second execution core for executing program instructions of the second instruction set architecture in a second operating mode;
    a control circuit coupled to the first execution core and the second execution core for exclusively selecting between the first operating mode and the second operating mode, wherein the second execution core is disabled in the first operating mode and the first execution core is disabled in the second operating mode; and
    a package for containing the first execution core, the second execution core and the control circuit and providing electrical terminals for interfacing the system to external devices, the program instructions of the first instruction set architecture are associated with a first virtual machine, the first virtual machine provides a first operating system environment, the program instructions of the second instruction set architecture are associated with a second virtual machine different from the first virtual machine, the second virtual machine provides a second operating system environment different from the first operating system environment.

2. The system of claim 1, wherein the first execution core and the second execution core are integrated on a single die within the package.

3. The system of claim 1, further comprising a lowest-level cache coupled to the first execution core and coupled to the second execution core.

4. The system of claim 1, further comprising:
    a first lowest-level cache coupled to the first execution core; and
    a second lowest-level cache coupled to the second execution core.

5. The system of claim 1, wherein the first instruction set architecture is an x86 architecture.

6. A method of operating a processor integrated circuit for executing program instructions, wherein the program instructions comprise program instructions belonging to a first instruction set architecture and a second instruction set architecture distinct from the first instruction set architecture, the method comprising:
    selecting a first operating mode of the processor integrated circuit;
    responsive to selecting the first operating mode, activating a first execution core for executing program instructions of the first instruction set architecture, wherein the first execution core is incompatible with the second instruction set architecture;
    executing the program instructions of the first instruction set while the processor integrated circuit is in the first operating mode;
    selecting the second operating mode of the processor integrated circuit;
    responsive to selecting the second operating mode, deactivating the first execution core;
    further responsive to selecting the second operating mode, activating a second execution core for executing program instructions of the second instruction set architecture, wherein the second execution core is incompatible with the first instruction set architecture; and
    executing the program instructions of the second instruction set while the processor integrated circuit is in the second operating mode, and wherein responsive to selecting the first operating mode, the second execution core is deactivated, wherein the deactivating the first execution core comprises disabling a first power supply voltage previously provided to the first execution core, and wherein the deactivating the second execution core comprises disabling a second power supply voltage previously provided to the second execution core, wherein the program instructions of the first instruction set architecture are associated with a first virtual machine, the first virtual machine provides a first operating system environment, the program instructions of the second instruction set architecture are associated with a second virtual machine different from the first virtual machine, the second virtual machine provides a second operating system environment different from the first operating system environment.

7. The method of claim 6, further comprising providing data values to the first execution core or the second execution core from a single lowest-level cache coupled to the first execution core and coupled to the second execution core.

8. The method of claim 6, wherein the first execution core does not receive the first power supply voltage during the second operating mode, the second execution core does not receive the second power supply voltage during the first operating mode.

9. The method of claim 6, wherein the first instruction set architecture is an x86 architecture.

10. A processing system, comprising:
    a plurality of processing cores; and
    a memory for storing program instructions for execution by the plurality of processing cores and storing data operated on by the processing cores, wherein the program instructions comprise program instructions belonging to a first instruction set architecture and a second instruction set architecture distinct from the first instruction set architecture, and wherein at least two of the processing cores are integrated in a processor integrated circuit that includes a first execution core for executing program instructions of the first instruction set architecture in a first operating mode, wherein the first execution core is incompatible with the second instruction set architecture, a second execution core for executing program instructions of the second instruction set architecture in a second operating mode, a control circuit coupled to the first execution core and the second execution core for exclusively selecting between the first operating mode and the second operating mode, wherein the second execution core is disabled in the first operating mode and the first execution core is disabled in the second operating mode, and a package for containing the first execution core, the second execution core and the control circuit and providing electrical terminals for interfacing the processing system to external devices, wherein the processor integrated circuit further comprises a power management unit for providing a first power supply voltage to the first execution core in the first operating, wherein the power management unit does not provide power to the first execution core in the second operating mode, and wherein the power management unit does not provide power to the second execution core in the first operating mode, the program instructions of the first instruction set architecture are associated with a first virtual machine, the first virtual machine provides a first operating system environment, the program instructions of the second instruction set architecture are associated with a second virtual machine different from the first virtual machine, the second virtual machine provides a second operating system environment different from the first operating system environment.

11. The processing system of claim 10, wherein the first execution core and the second execution core are integrated on a single die within the package.

12. The processing system of claim 10, further comprising a service processor coupled to the processor integrated circuit, wherein the control circuit receives one or more commands from the service processor to terminate the first operating mode and commence the second operating mode, and wherein the control circuit selects between the first operating mode and the second operating mode in response thereto.

13. The processing system of claim 10, wherein
the first execution core does not receive the first power supply voltage during the second operating mode.

* * * * *